United States Patent [19]

Thrane et al.

[11] 4,206,930
[45] Jun. 10, 1980

[54] CIRCUMFERENTIALLY COMPRESSED PISTON RING ASSEMBLY AND METHOD

[75] Inventors: Gordon E. Thrane, Akron, N.Y.; Brian L. DePerro, South Bend, Ind.

[73] Assignee: Chemprene, Inc., Alden, N.Y.

[21] Appl. No.: 801,638

[22] Filed: May 31, 1977

[51] Int. Cl.² ............................................... F16J 9/00
[52] U.S. Cl. ...................................... 277/165; 277/216
[58] Field of Search ................................. 277/165, 216

[56] References Cited

U.S. PATENT DOCUMENTS

| | | | |
|---|---|---|---|
| 1,008,999 | 11/1911 | Wasson | 277/216 |
| 1,449,615 | 3/1923 | McLeod | 277/216 |
| 1,499,571 | 7/1924 | Davis | 277/216 |
| 2,876,052 | 3/1959 | Burt | 277/165 |
| 2,877,070 | 3/1959 | Lee | 277/165 |
| 2,877,071 | 3/1959 | Arnot | 277/216 |
| 3,751,047 | 8/1973 | McGee | 277/216 |
| 3,770,285 | 11/1973 | Grover | 277/216 |
| 3,885,800 | 5/1975 | Sienenpiper | 277/165 |
| 4,109,924 | 8/1978 | Stucke | 277/165 |

*Primary Examiner*—Robert I. Smith
*Attorney, Agent, or Firm*—Lockwood, Dewey, Alex & Cummings

[57] ABSTRACT

A sealing assembly especially adapted for high pressure hydraulic applications includes a circumferentially compressible seal ring having stepped overlapping ends and a resilient expander, preferably of oval cross-section, which assists in urging the compressed seal ring into sealing communication with the thus sealed surfaces. The seal ring is manufactured with an oversized closed gap condition from a filled synthetic material having a modulus of elasticity sufficient to permit compression thereof when the seal ring is installed between the thus sealed surfaces. The ring may optionally include a secondary resilient sealing member positioned between the axial, internal surfaces of the steps.

13 Claims, 15 Drawing Figures

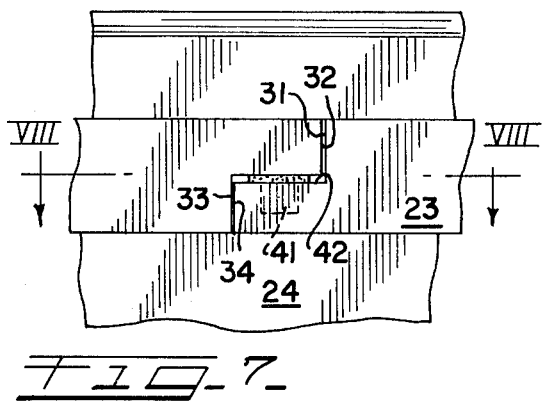
FIG-7-
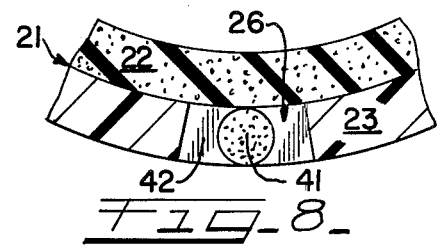
FIG-8-
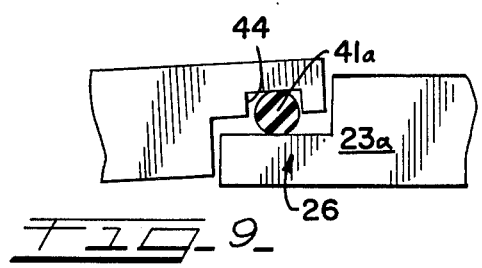
FIG-9-
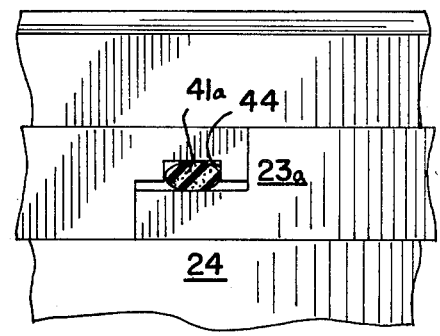
FIG-10-
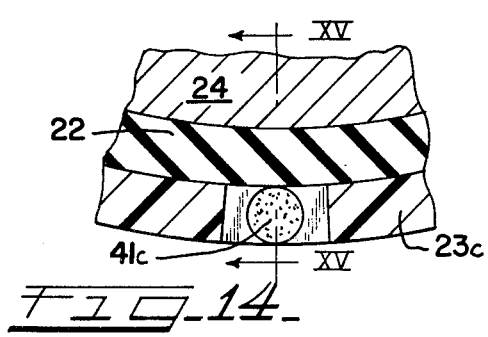
FIG-11-
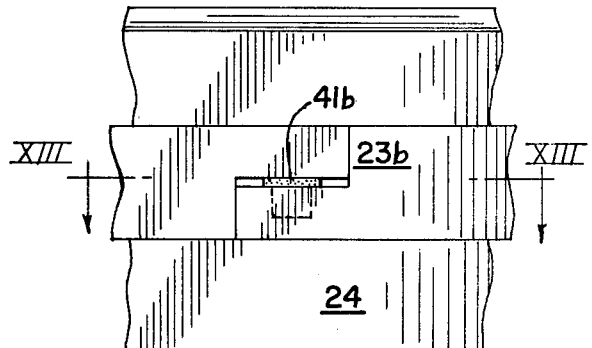
FIG-12-
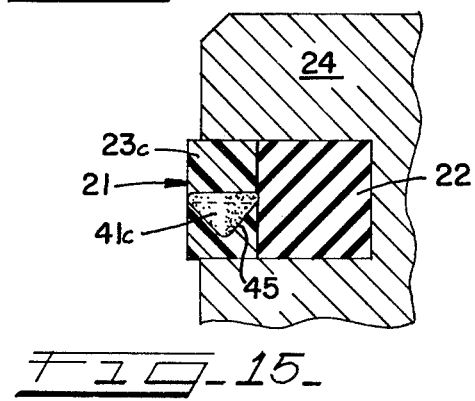
FIG-14-
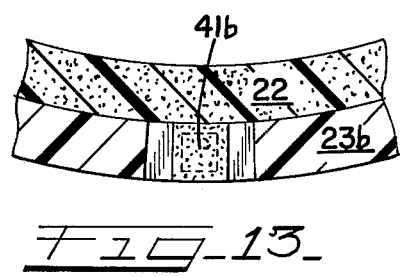
FIG-13-
FIG-15-

CIRCUMFERENTIALLY COMPRESSED PISTON RING ASSEMBLY AND METHOD

BACKGROUND AND DESCRIPTION OF THE INVENTION

The present invention generally relates to sealing devices and methods and, more particularly, to improved sealing devices and methods which are especially adapted for sealing piston and cylinder assemblies and the like. In this regard, an important embodiment of the present invention is directed to an improved sealing assembly and method wherein a circumferentially compressed stepped joint piston ring and expander are positioned within an annular groove in a piston employed in high pressure hydraulic applications.

Piston ring and expander combinations have heretofore been employed as sealing devices in piston and cylinder assemblies used in a wide variety of applications. In general, it has been found advantageous to manufacture these rings of one-piece, substantially rigid construction with a split therein so as to facilitate their installation in a groove in the piston in overlying relation with the expander.

Heretofore, many of these split piston rings have been composed of a wide variety of materials including synthetic resins and have been characterized by a so-called stepped joint construction; that is, one wherein the ring ends are stepped and overlay one another. In accordance with previously employed techniques, these rings were manufactured with a gap or circumferential spacing in their pre-installed condition which was expected to close or substantially close when the ring was fully installed within the bore of the cylinder in overlying relation with the elastomeric expander in a groove in the piston.

Experience with these synthetic resin stepped joint piston ring and elastomer expanders, however, has indicated a higher failure rate than was originally anticipated. In this regard, it was found that upon installation in the cylinder bore, a gap was present, resulting in nibbling or extrusion of the elastomeric expander into the gap and producing a failure of the seal assembly. It is believed that this problem has been caused, at least in part, by frictional forces present between the expander and ring, when installed, which have prevented circumferential travel of the ring ends to the extent necessary to close or at least substantially close the gap.

In accordance with the present invention, the foregoing problems and disadvantages of these stepped joint piston ring and expander sealing devices have been overcome through the use of stepped joint piston rings composed of a circumferentially compressible synthetic resin in an oversized closed gap condition; that is, one wherein prior to final installation in the cylinder bore, the ring ends are in contact with each other, or at least in very close spacial relation from each other. Installation of these rings within the bore of a cylinder is accomodated by reason of the compression of the ring itself. As such, the practice of the present invention has resulted in the elimination of a gap in which the elastomeric oval expander can extrude into or nibble on and, at the same time, has produced increased circumferential pressure of the ring thereby substantially improving the effectiveness of the seal ring within the cylinder bore.

An object of this invention is to provide an improved seal assembly and method.

Another object of the present invention is an improved seal assembly and method that is especially suitable for use in an annular groove in a piston employed in high pressure applications.

Another object of the present invention is to provide a split seal ring in combination with a resilient expander wherein the split seal ring is manufactured with an oversized closed gap condition and is itself circumferentially compressed when installed between the surfaces to be sealed.

Another object of the invention is an improved ring used in combination with a resilient expander ring, which improved ring has an oversized closed stepped joint gap condition and further has a modulus of elasticity which combine to allow for circumferential compression of the ring upon installation.

Another object of the invention is an improved piston, cylinder and seal assembly especially suitable for hydraulic applications, which assembly includes a resilient expander positioned in combination with a split, one-piece piston ring that has an oversized closed gap condition and is circumferentially compressed when installed.

Another object of the invention is an improved method for sealing opposing, reciprocating surfaces by circumferentially compressing a sealing member having an oversized closed gap condition between said opposed surfaces to the extent that the sealing member remains in closed gap condition during reciprocation of the opposed, sealed surfaces.

Further objects and advantages of this invention will become more clearly apparent from the following description and accompanying drawings in which like reference numerals indicate corresponding parts throughout the several figures and wherein:

FIG. 7 is a fragmentary elevational view of a seal assembly incorporating the stepped joint ring of FIG. 6, shown as installed;

FIG. 8 is a horizontal sectional view of the seal assembly taken along the line VIII—VIII of FIG. 7;

FIG. 9 is a fragmentary elevational view of another embodiment of the stepped joint ring, depicted prior to installation;

FIG. 10 is a fragmentary elevational view of the seal assembly, showing the ring of FIG. 9 after installation;

FIG. 11 is a horizontal view, partly in plan and partly in section, showing certain parts of the end gap seal construction of FIG. 10 with portions thereof broken away;

FIG. 12 is a fragmentary elevational view of a further embodiment, showing a further embodiment of the stepped joint ring after installation;

FIG. 13 is a horizontal sectional view of the seal assembly of FIG. 12, taken along the line XIII—XIII of FIG. 12;

FIG. 14 is a horizontal sectional view of one other embodiment of the seal assembly after it has been installed; and FIG. 15 is a vertical sectional view of the seal assembly of FIG. 14, taken along the line XV—XV.

While seal assemblies and the method of this invention may be used in different environments, the invention described herein is adapted for use as a piston ring in piston and cylinder assemblies for use in high-pressure oil hydraulic applications.

Figure 1:
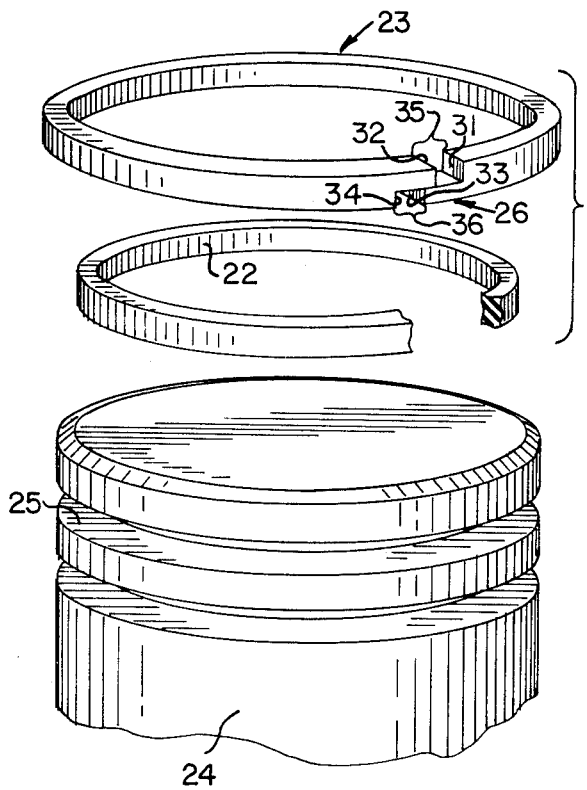
FIG. 1 is an exploded perspective view of one embodiment of the invention, depicting the stepped joint ring before installation.

Referring to the drawings in greater detail, FIG. 1 shows a sealing assembly in accordance with this invention, generally referred to by reference numeral 21. Assembly 21 includes a resilient expander 22 and a circumferentially compressible seal ring having an oversized closed gap condition, which ring is generally referred to by reference numeral 23. Also shown is a cylindrical piston 24 having one or more cylindrical grooves 25. Seal ring 23 preferably includes a stepped joint, generally referred to by reference numeral 26. Stepped joint 26 includes opposing radially extending surfaces 31, 32, and 33, 34.

Prior to installation, as depicted in FIG. 1, gaps 35 and 36 may be present between the opposing radial surfaces 31, 32 and 33, 34, respectively. Gaps 35 and 36 may be between 0 to 0.010 inch, measured approximately along the circumference of ring 23, per inch of diameter of the ring 23. In any event, gaps 35 and 36 are sized such that ring 23 is manufactured with an oversized closed gap condition to insure that the gaps 35 and 36 will be substantially eliminated even after ring 23 has been installed and circumferentially compressed while in overlying, frictional relationship with expander 22.

Figure 2:
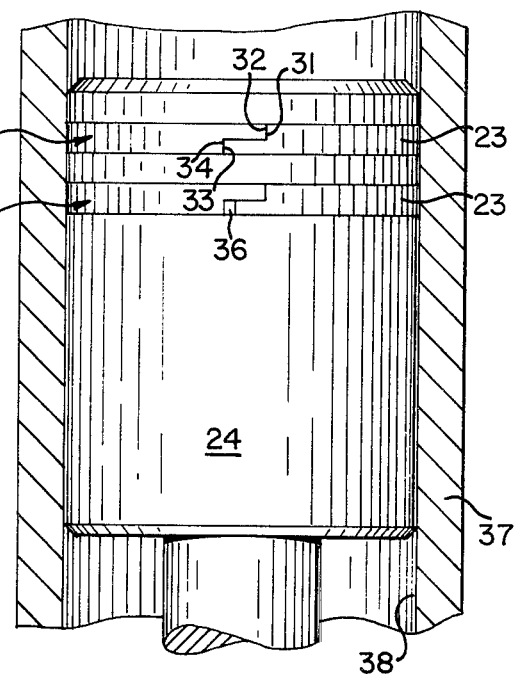
FIG. 2 is an elevational view of the embodiment of FIG. 1, shown installed in a circumferential groove of a piston positioned within a circular cylinder shown in cross-section.

As shown in FIG. 2, when assembly 21 is installed, gaps 35 and 36, if present prior to installation, are substantially eliminated, and at least one of the opposing radial surface pairs 31, 32 and 33, 34 are in mating engagement. The seal ring 23 is itself compressed circumferentially. FIG. 2 depicts sealing assemblies installed within grooves of piston 24 which is positioned for reciprocating movement within a cylinder 37, having a wall 38.

Figure 3:
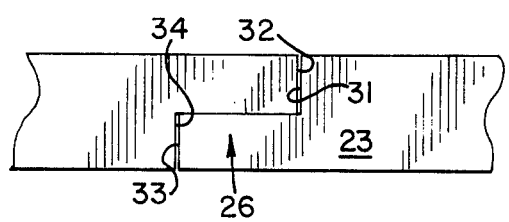
FIG. 3 is an enlarged fragmentary elevational view of the stepped joint ring of FIG. 1.
Figure 4:
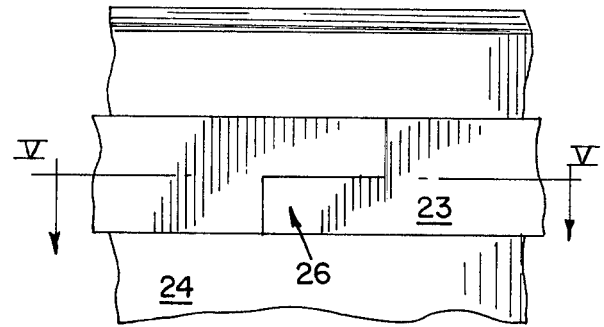
FIG. 4 is an enlarged fragmentary elevational view of the stepped joint ring of FIG. 2.
Figure 5:
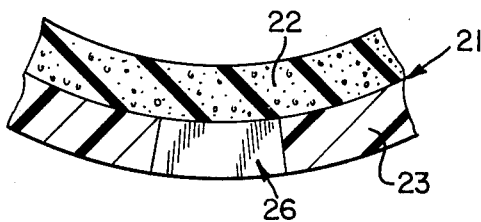
FIG. 5 is a horizontal sectional view of the installed seal assembly depicted in FIGS. 2 and 4, taken along line V—V of FIG. 4.

FIG. 3 illustrates the stepped joint 26 of ring 23 having substantially no gaps prior to installation of the sealing assembly 21. FIG. 4 shows that same assembly after it is installed on piston 24 and within cylinder 37 (FIG. 2). In this embodiment, the stepped joint 26 has its axial surfaces in substantial mating engagement with no gap therebetween. From FIG. 5, the overlying engagement, which is an abutting, circumferential engagement, between the resilient expander 22 and the circumferentially compressible seal ring 23, both after installation, is depicted. From this it can be seen that resilient expander 22 provides radial forces against the internal circumference of the circumferentially compressed seal ring 23, which force is transmitted through ring 23 to enhance the sealing engagement between sealing assembly 21 and cylinder wall 38 (FIG. 2).

Figure 6:
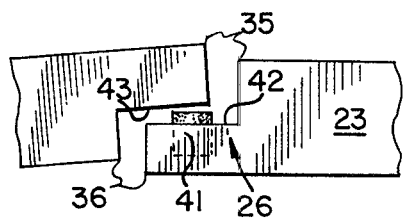
FIG. 6 is a fragmentary elevational view of the preferred embodiment of the stepped joint ring, depicted prior to installation.

In FIG. 6, the preferred embodiment of the circumferentially compressible seal ring 23 is shown prior to installation. A secondary resilient seal 41 is mounted along one of the pair of oppositely directed axial surfaces 42 or 43. Secondary seal 41 is constructed and positioned so that it will be compressed, upon installation, both radially and axially. FIG. 7 shows secondary resilient seal 41 in its compressed, installed state. This compression insures that axial surfaces 42 and 43 are in mutual engagement, through secondary seal 41, in order to provide a securely fitting stepped joint relationship. Compressed seal 41 also substantially fills the radial extent of the opening between axial surfaces 42 and 43 to prevent the passage of any fluids which might seep between the closed gaps of the opposing radial surfaces 31, 32 and 33, 34. This arrangement, for practical purposes, eliminates leakage between the ring 23 and the pertinent sealed surface, for example, cylinder wall 38 (FIG. 2). FIG. 8 shows compressed seal 41 filing the radial extent of axial surface 42 and axial surface 43 (FIG. 7).

In FIG. 9, the secondary resilient seal 41a is located along stepped joint 26 within a detent 44 that is open along a radially extending edge of seal ring 23a. This provides a manner of mounting seal 41a within a ring 23a that is more easily molded than the ring 23 of, for example, the embodiment shown in FIG. 6, wherein there are no apertures throughout the entire area of the axially extending circumferential surface of ring 23, which includes the surface area immediately adjacent secondary resilient seal 41. FIGS. 10 and 11 further illustrate the configuration of the secondary resilient seal 41a of this embodiment.

FIGS. 12 and 13 show yet a further configuration of the secondary resilient seal 41b which has a generally cubic structure prior to installation. FIGS. 12 and 13 depict the installed combination of ring 23b, resilient insert 22, and the compressed secondary seal 41b.

FIGS. 14 and 15 depict a further configuration of secondary resilient seal 41c and ring 23c. Conical seal 41c is received within a conical opening 45 along the ring 23c. This seal 41c is shown only in its installed, compressed state.

In the various embodiments discussed herein, resilient expander 22 is preferably constructed of a synthetic rubber, for example, a nitrile rubber. Other suitable elastomeric materials may be substituted.

The circumferentially compressible seal ring 23 must be of appropriate elasticity so as to permit the ring 23 having the oversized closed gap condition to be both installed over the piston 24 or the like and also to be circumferentially compressed upon installation into the cylinder 37 or the like. This requires a material of the type discussed elsewhere herein having a modulus of elasticity and a heat deflection temperature within the ranges specified herein. The preferred material for ring 23 is a nylon (polyamide) material that is glass fiber filled at a level of about 30% by weight, having a modulus of elasticity of about 1,300,000 pounds per square inch, and having a heat deflection temperature of about 485° F. at 264 psi. Other suitable molded resins may be substituted for the preferred filled nylon, provided they meet the requirements contained herein.

The method of sealing in accordance with this invention eliminates or significantly reduces leakage between opposing, reciprocating surfaces. The method includes providing a sealing surface supplying ring having an oversized closed gap condition in order to impart circumferential and radial compressive forces along one of the reciprocating surfaces to provide a uniformly fitting seal, to improve sealing of the surfaces, and to significantly extend the life of the seal.

More particularly, the method of the present invention includes selecting a seal ring that exhibits an oversized closed gap condition to insure that there will be substantially no gaps in the sealing surface or the seal ring even after the ring has been installed and circumferentially compressed over an underlying resilient expander member. The preferred ring has a modulus of elasticity between about 900,000 to 4,000,000 pounds per square inch, preferably between about 1,000,000 to 3,000,000 pounds per square inch. The preferred materials should also have a heat deflection temperature between about 300° to 600° F., preferably between about 400° to 525° F. Generally, these will be injection or compression molded thermoplastic or thermoset synthetic resins, preferably of the self-lubricating type. Ring members of this type can be manufactured in an oversized closed gap condition and can be advantageously circumferentially compressed in accordance with this method.

As previously mentioned, the preferred material for the ring member is a filled polyamide. Examples of other suitable materials include polysulfones, polyether sulfones, polyphenylene sulfides, ethylene-tetrafluoroethylene, and polybutylene terephthalate. Preferably these materials are self-lubricating, are injection or compression molded, and include a suitable filler, such as glass fiber or carbon. These materials generally have some self-lubricating properties without having to add special lubrication substances. They may also have incorporated therein lubricants such as molybdenum disulfide, teflon, or silicone oils so as to increase their self-lubricating properties.

The method includes circumferentially compressing a ring having a sealing surface that is in overlying circumferential communication with a resilient expander member to thereby develop radial and circumferential expansive forces. This circumferentially compressed sealing surface is usually provided by gradually compressing the synthetic resin seal ring member around the resilient expander member, which is itself thus radially and circumferentially compressed, while feeding the leading circumferential edge of the ring member between the surfaces being sealed. This step continues until all of the sealing surface is between the reciprocable surfaces being sealed.

By these steps, the generally circumferential forces applied to compress the seal ring member in conjunction with its oversized closed gap condition and the generally radial forces provided by the resilient expander member combine to provide a slidable seal between opposing cylindrical surfaces, which seal remains substantially leakage-free during reciprocating movement of the cylindrical surfaces. Most importantly, the resilient expander remains substantially undamaged because the seal ring installation in accordance with this method eliminates any significant gaps in the ring which avoids nibbling or extrusion of the resilient, elastomeric expander member which will lead to eventual failure of the seal assembly.

As an optional step in this method, a secondary resilient expander member may be provided within a stepped joint of the seal ring member. By this step, a secondary seal is formed in order to substantially eliminate any fluid leakage through the axial surfaces of the stepped joint. Generally, without this optional step, the method permits some minimal leakage across the sealing surface. When this optional step is included, such leakage is all but eliminated. Depending upon variables such as the fluids being acted upon by the piston-and-cylinder assembly, reciprocation speeds, time, and temperature, leakage on the order of 10 cc per minute may be observed when this step of providing the secondary seal is omitted.

This invention is particularly suitable for use within piston and cylinder arrangements included in heavy duty hydraulically powered equipment, for example, for a back hoe system of materials handling equipment.

Modifications and variations of the described embodiments of this invention will be apparent to those skilled in the art, and it is thus contemplated that such changes may be made without departing from the spirit of the invention or the scope of the appended claims.

We claim:

1. In a piston, cylinder and seal assembly combination, said piston being located within said cylinder for relative movement with respect thereto and including at least one seal-receiving groove formed therein, said seal assembly including an expander seal ring composed of a resilient material disposed within said groove and a split seal ring disposed within said groove radially outwardly with respect to said resilient expander seal ring and in circumferentially contacting overlying relation therewith, said cylinder having a given internal diameter, said split seal ring being formed of a compressible synthetic resin and including at least one pair of opposing, axially and radially extending surfaces at the split thereof, the improvement comprising said split seal ring having an oversized closed gap condition with respect to said given internal diameter of the cylinder such that said pair of opposing, axially and radially extending surfaces thereof are in circumferentially compressive, force-imparting direct contact with each other, whereby said split seal ring is in a circumferential compressive strain condition.

2. The combination of claim 1 wherein the modulus of elasticity of the split seal ring is between about 1,000,000 to 3,000,000 pounds per square inch.

3. The combination of claim 1 wherein the heat deflection temperature of the split seal ring is between about 400° to 525° F.

4. The combination of claim 1 wherein said compressible synthetic resin is selected from the group consisting of polyamides, polysulfones, polyether sulfones, polyphenylene sulfides, ethylenetetrafluoroethylene, and polybutylene terephthalate.

5. The combination of claim 1 wherein said compressible synthetic resin has self-lubricating properties.

6. The combination of claim 1 wherein said compressible synthetic resin is a filled synthetic resin.

7. The combination of claim 1 wherein said split seal ring is composed of a synthetic resin into which lubricants are incorporated.

8. The assembly of claim 1 further comprising a radially and axially compressible secondary resilient seal mounted within a detent of said split seal ring, said detent being open along a radially extending edge of the seal ring.

9. The combination of claim 1 wherein the split of said split seal ring is in the form of a stepped joint having at least two of said pairs of opposing axially and radially extending surfaces and a pair of axially opposed surfaces.

10. The combination of claim 9 further comprising a radially and axially compressible secondary resilient seal member mounted along one of said pair of opposing axial surfaces.

11. The combination of claim 1 wherein said seal ring has a modulus of elasticity between about 900,000 and 4,000,000 pounds per square inch and a heat deflection temperature between about 300° and 600° F.

12. The combination of claim 1 wherein said pair of opposing, axially and radially extending surfaces of said split seal ring are in said circumferentially compressive, force-imparting direct contact with each other without any substantial amount of resilient material from said resilient expander seal therebetween.

13. The combination of claim 1 wherein said oversized closed gap condition is a condition at which said split seal ring, prior to said installed circumferential compressive strain condition and with said pair of opposing, axially and radially extending surfaces in direct contact with each other, has an outer diameter greater than said given diameter of said cylinder.

* * * * *